US011215361B2

(12) United States Patent
Tsuru et al.

(10) Patent No.: US 11,215,361 B2
(45) Date of Patent: Jan. 4, 2022

(54) COOLING STRUCTURE WITH RIBS FOR GAS TURBINE ENGINE

(71) Applicant: KAWASAKI JUKOGYO KABUSHIKI KAISHA, Kobe (JP)

(72) Inventors: Tomoko Tsuru, Akashi (JP); Katsuhiko Ishida, Kobe (JP); Yuwa Kawahara, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 107 days.

(21) Appl. No.: 16/206,154

(22) Filed: Nov. 30, 2018

(65) Prior Publication Data
US 2019/0101287 A1    Apr. 4, 2019

Related U.S. Application Data

(63) Continuation of application No. PCT/JP2017/020096, filed on May 30, 2017.

(30) Foreign Application Priority Data

Jun. 1, 2016   (JP) .............................. JP2016-109874

(51) Int. Cl.
*F23M 5/08*       (2006.01)
*F02C 7/18*       (2006.01)
(Continued)

(52) U.S. Cl.
CPC ............... *F23M 5/085* (2013.01); *F02C 7/18* (2013.01); *F23R 3/002* (2013.01); *B23C 3/34* (2013.01);
(Continued)

(58) Field of Classification Search
CPC ... F23R 2900/03045; F28F 1/126; F28F 1/24; F28F 1/26; F28F 3/025; F28F 3/048;
(Continued)

(56) References Cited

U.S. PATENT DOCUMENTS 3,741,285 A * 6/1973 Kuethe ................... F28F 13/12
165/181
6,666,262 B1 * 12/2003 Parneix ..................... F28F 1/40
165/109.1
(Continued)

FOREIGN PATENT DOCUMENTS

CN        104712372 A     6/2015
JP        2005-002899 A   1/2005
(Continued)

OTHER PUBLICATIONS

Konig, W.; Klocke, F: Fertigungsverfahren 1.7th ed., Berlin; Springer Verlag, 2002, p. 351 to 354.—ISBN 978-3-662-97202-8.
(Continued)

*Primary Examiner* — Andrew H Nguyen
*Assistant Examiner* — Stephanie Sebasco Cheng
(74) *Attorney, Agent, or Firm* — Sughrue Mion, PLLC

(57) ABSTRACT

In a structure for cooling a component member of a gas turbine using a working gas, a plurality of heat transfer enhancement ribs having W shapes are provided so as to project from the wall surface of a passage wall facing a cooling medium passage through which a cooling medium flows. In each heat transfer enhancement rib, outside corner portions facing toward the upstream side are formed in an angled shape, and at least any one of inside corner portions and outside corner portions other than the outside corner portion facing toward the upstream side are formed in a curved shape.

5 Claims, 5 Drawing Sheets

(51) Int. Cl.
  *F23R 3/00* (2006.01)
  *B23C 3/34* (2006.01)
(52) U.S. Cl.
  CPC ...... *F05D 2230/10* (2013.01); *F05D 2250/75* (2013.01); *F05D 2260/2212* (2013.01); *F05D 2260/22141* (2013.01); *F23R 2900/03045* (2013.01)
(58) Field of Classification Search
  CPC .............. F28F 13/12; F05D 2230/2212; F05D 2230/22141; F05D 2240/126; F05D 2240/127; F05D 2250/183; F05D 2250/184; F05D 2250/185; F05D 2250/294; F05D 2250/71; F05D 2250/711; F05D 2250/712; F05D 2250/713; F05D 2250/73; F05D 2250/75; F05D 2260/2212; F05D 2260/22141
  See application file for complete search history.

(56) References Cited

U.S. PATENT DOCUMENTS

| | | | |
|---|---|---|---|
| 7,373,778 | B2 | 5/2008 | Bunker et al. |
| 7,544,044 | B1 | 6/2009 | Liang |
| 9,921,000 | B2 * | 3/2018 | Fetvedt ................. F28D 9/0062 |
| 2005/0281673 | A1 | 12/2005 | Draper et al. |
| 2006/0042255 | A1 | 3/2006 | Bunker et al. |
| 2010/0223931 | A1 * | 9/2010 | Chila ...................... F23R 3/005 60/760 |
| 2013/0025837 | A1 * | 1/2013 | Takenaga .............. H01L 23/473 165/168 |
| 2015/0377029 | A1 | 12/2015 | Blake et al. |

FOREIGN PATENT DOCUMENTS

| | | | |
|---|---|---|---|
| JP | 2006-002758 A | | 1/2006 |
| JP | 2006-063984 A | | 3/2006 |
| JP | 2006-100293 A | | 4/2006 |
| JP | 2006100293 A | * | 4/2006 |
| JP | 2007-132640 A | | 5/2007 |
| JP | 2007132640 A | * | 5/2007 |
| JP | 2017108045 A | * | 6/2017 ............. H01L 25/07 |

OTHER PUBLICATIONS

Tschatsch, H.: Praxis der Zerspanungstechnik, 6th ed., Wiesbaden; Springer Fachmedien Wiesbaden, 2002, p. 173 to 175 and 198 to 200.—ISBN 978-3-322-94280-7.

Communication dated Oct. 11, 2021, issued by the German Patent and Trademark Office in corresponding German Application No. 112017002810.8.

* cited by examiner

COOLING STRUCTURE WITH RIBS FOR GAS TURBINE ENGINE

CROSS REFERENCE TO THE RELATED APPLICATION

This application is a continuation application, under 35 U.S.C. § 111(a), of international application No. PCT/JP2017/020096, filed May 30, 2017, which claims priority to Japanese patent application No. 2016-109874, filed Jun. 1, 2016, the disclosure of which are incorporated by reference in their entirety into this application.

BACKGROUND OF THE INVENTION

Field of the Invention

The present invention relates to a structure for cooling component members of a gas turbine engine.

Description of Related Art

In recent years, in a gas turbine engine, it has been desired that the amount of air for combustion is increased to suppress increase in flame temperature, for the purpose of suppressing generation of NOx due to high-temperature combustion. Accordingly, in order to decrease air (cooling air) that does not contribute to combustion itself, improvement in convection cooling performance of a combustor liner has been attempted. As a cooling structure for a combustor liner, for example, the following structures are known: a structure in which V-shaped heat transfer enhancement ribs are arranged on the outer circumferential surface of a combustor liner (see Patent Document 1), and a structure in which W-shaped heat transfer enhancement ribs are continuously formed on the outer circumferential surface of a combustor liner. In the case of using ribs having such a shape, since an outside corner portion of a side surface on the upstream side of the rib has an angled shape, compressed air collides with the heat transfer enhancement rib to effectively cause turbulent flow, whereby cooling of the outer circumferential surface of the combustor liner is promoted.

RELATED DOCUMENT

Patent Document

[Patent Document 1] JP Laid-open Patent Publication No. 2006-63984

SUMMARY OF THE INVENTION

However, the heat transfer enhancement ribs formed by continuous W shapes have a problem with reliability. That is, in general, in a combustor liner, a great thermal stress occurs due to temperature difference between inside and outside, and further, due to pressure difference between inside and outside, a pressure load constantly acts on the inside from the outside during operation. Therefore, in heat transfer enhancement ribs having outside corner portions or inside corner portions in an angled shape such as V shape or W shape, it is likely that a crack occurs by concentration of stress on the angled part.

An object of the present invention is to provide a gas turbine engine cooling structure having excellent cooling performance and high reliability, in order to solve the above problem.

In order to attain the above object, a gas turbine engine cooling structure according to the present invention is a structure for cooling a component member of a gas turbine engine using a working gas of the gas turbine engine as a cooling medium, the gas turbine engine cooling structure including: a passage wall formed from a part of the component member and facing a cooling medium passage through which the cooling medium flows; and a plurality of heat transfer enhancement ribs projecting from a wall surface of the passage wall and having W shapes, each heat transfer enhancement rib including adjacent corner wall portions formed so as to protrude alternately toward an upstream side and a downstream side in a flow direction of the cooling medium, in which an outside corner portion, facing toward the upstream side, of each heat transfer enhancement rib is formed in an angled shape, and at least any one of an inside corner portion facing toward the upstream side, an outside corner portion facing toward the downstream side, and an inside corner portion facing toward the downstream side, of each heat transfer enhancement rib is formed in a curved shape.

The inside corner portion facing toward the upstream side, the outside corner portion facing toward the downstream side, and the inside corner portion facing toward the downstream side may be all formed in a curved shape.

According to the above configuration, the outside corner portions facing toward the upstream side, with which a cooling medium directly collides and which are an area having a high heat transfer rate, remain in an angled shape so that the cooling effect by the heat transfer enhancement rib group is kept, whereas the other outside corner portions and the inside corner portions, which have comparatively low heat transfer rates and which have less influence on the cooling effect, are formed in a curved shape, whereby stress concentration on the outside corner portions and the inside corner portions formed in a curved shape is reduced. Thus, it is possible to increase reliability while keeping an excellent cooling effect of the cooling structure having the heat transfer enhancement rib group.

In one embodiment of the present invention, the following configuration may be employed. The plurality of heat transfer enhancement ribs are arranged such that the corner wall portions protruding toward the upstream side and the corner wall portions protruding toward the downstream side, of the heat transfer enhancement ribs, are respectively aligned at identical positions with respect to a transverse direction of the cooling medium passage; the inside corner portion facing toward the upstream side and the inside corner portion facing toward the downstream side, of each heat transfer enhancement rib are formed in a curved shape; the outside corner portion facing toward the downstream side, of each heat transfer enhancement rib is formed in an angled shape; and a radius of curvature of the inside corner portion facing toward the upstream side is equal to a radius of curvature of the inside corner portion facing toward the downstream side, and is equal to a distance between the adjacent heat transfer enhancement ribs. The above configuration makes it possible to form heat transfer enhancement ribs that enable enhancement in mechanical strength while keeping the cooling effect, using a cutting tool such as an end mill, with an extremely small number of processing steps.

In one embodiment of the present invention, the component member may be, for example, a combustor liner of a cylindrical shape that forms a combustion chamber of a combustor therein, and the cooling medium passage may be a supply passage for a working gas formed between the combustor liner and a casing of the combustor. The above configuration makes it possible to increase reliability without losing the cooling effect as described above, in the cooling structure for a combustor liner which is a member that will be particularly exposed to high temperature among the component members of the gas turbine engine.

A method for forming the heat transfer enhancement ribs in the above cooling structure, according to the present invention, includes forming one W-shaped groove by cutting the wall surface of the passage wall of the component member once or a plurality of times along a trajectory having a predetermined W shape by the use of a cutting tool which performs cutting with a blade provided on an outer circumferential surface of a columnar rotary body. The heat transfer enhancement ribs in the above cooling structure can be formed with a small number of processing steps by the above method using the cutting tool such as an end mill.

In particular, in the case where each heat transfer enhancement rib is formed such that the radius of curvature of the inside corner portion facing toward the upstream side is equal to the radius of curvature of the inside corner portion facing toward the downstream side, and is equal to a distance between the adjacent heat transfer enhancement ribs, it is possible to form one W-shaped groove by performing cutting once along a trajectory having a predetermined W shape by the use of a cutting tool having a processing diameter corresponding to the distance between the adjacent heat transfer enhancement ribs. Therefore, the heat transfer enhancement ribs can be formed with an extremely small number of processing steps.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments according to the present invention will be described with reference to the drawings, but the present invention is not limited to the embodiments.

Figure 1:
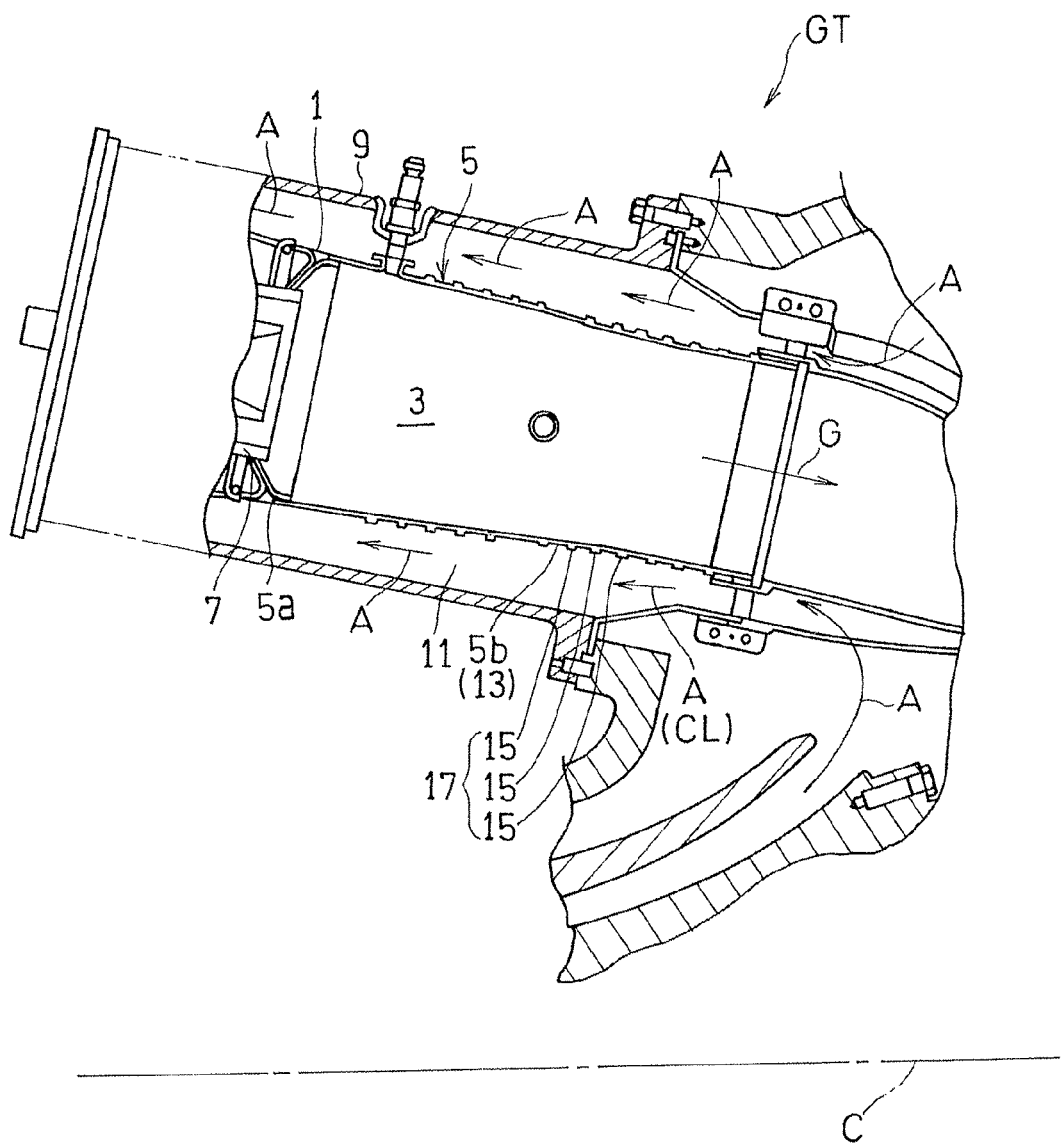
FIG. 1 is a partially cutaway side view showing a schematic structure of a gas turbine engine having a cooling structure according to an embodiment of the present invention.

FIG. 1 is a partially cutaway side view of a gas turbine engine (hereinafter, simply referred to as a gas turbine) GT having a cooling structure according to an embodiment of the present invention. In the gas turbine GT, an air A introduced from outside is compressed by a compressor (not shown) and introduced into a combustor 1, a fuel is combusted together with the compressed air A in the combustor 1, and a turbine (not shown) is driven by the obtained combustion gas G having a high temperature and a high pressure. The combustor 1 is disposed so as to be slightly inclined with respect to an axis C of the compressor and the turbine.

The combustor 1 includes a cylindrical combustor liner 5 forming a combustion chamber 3 therein, and a burner unit 7 which is attached to a top wall 5a of the combustor liner 5 and injects an air-fuel mixture of the fuel and the air A into the combustion chamber 3. The combustor liner 5 and the burner unit 7 are housed so as to be arranged concentrically with each other in a cylindrical combustor casing 9 which is an outer casing of the gas turbine combustor 1. In the shown example, the combustor 1 is of a reverse flow can type. That is, a supply passage 11 for the compressed air A is formed between the combustor casing 9 and the combustor liner 5, and the compressed air A flows through the supply passage 11 toward the head portion (burner unit 7 side) of the combustor 1.

In the present embodiment, the combustor liner 5, which is one of component members of the gas turbine GT, is cooled using, as a cooling medium CL, the air A which is a working gas for the gas turbine GT. Hereinafter, the cooling structure will be described.

A circumferential wall 5b of the combustor liner 5 forms a passage wall 13 of the supply passage 11. The circumferential wall 5b of the combustor liner 5 is provided with a plurality of heat transfer enhancement ribs 15 each projecting from the outer circumference of the circumferential wall 5b. The compressed air A collides with a heat transfer enhancement rib group 17 composed of the plurality of heat transfer enhancement ribs 15 so that the combustor liner 5 is cooled by convection. In other words, the supply passage 11 forms a cooling medium passage 19 through which the cooling medium CL flows, and the plurality of heat transfer enhancement ribs 15 are provided so as to project on the wall surface of the passage wall 13 that faces the cooling medium passage 19.

Figure 2:
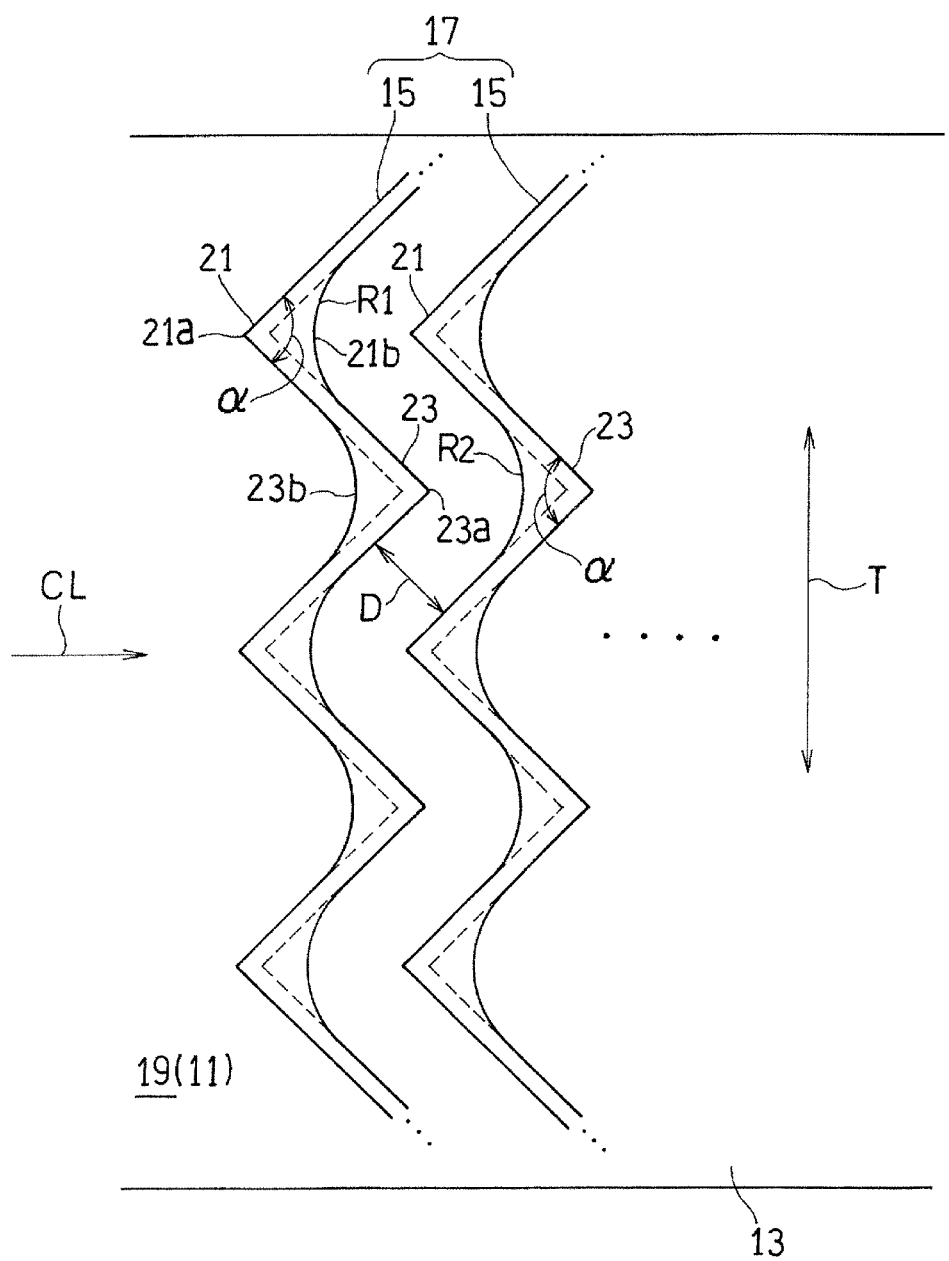
FIG. 2 is a plan view showing a schematic structure of the cooling structure according to the embodiment of the present invention.

As shown in FIG. 2, each of the heat transfer enhancement rib 15 has such a shape that W shapes are continuously connected in a plan view, and is arranged such that adjacent corner wall portions in the W shapes protrude alternately toward the upstream side and the downstream side in the flow direction of the cooling medium CL. In other words, the heat transfer enhancement ribs 15 generally extend along a transverse direction T of the cooling medium passage 19 formed by the supply passage 11. The term "W shape" used herein includes not only a single simple "W shape" but also such a shape that ribs are continuously added to the single simple "W shape" so as to have corner wall portions protruding alternately toward the upstream side and the downstream side in the flow direction of the cooling medium CL.

A plurality of heat transfer enhancement ribs 15 are arranged along the flow direction of the cooling medium CL.

The plurality of heat transfer enhancement ribs 15 are arranged such that corner wall portions (hereinafter, referred to as "convex corner wall portions") 21 protruding toward the upstream side of the cooling medium passage 19 and corner wall portions (hereinafter, referred to as "recessed corner wall portions") 23 protruding toward the downstream side are respectively aligned at identical positions with respect to the transverse direction T of the cooling medium passage 19. In the present embodiment, the "transverse direction T of the cooling medium passage 19" is the circumferential direction of the outer circumferential surface of the combustor liner 5 (FIG. 1).

In the present embodiment, a convex corner wall outside corner portion 21a, which is defined as an outside corner portion, of the convex corner wall portion 21 of the heat transfer enhancement rib 15, that faces toward the upstream side is formed in an angled shape. Also, a recessed corner wall outside corner portion 23a, which is defined as an outside corner portion, of the recessed corner wall portion 23 of the heat transfer enhancement rib 15, that faces toward the downstream side is formed in an angled shape. On the other hand, a convex corner wall inside corner portion 21b, which is defined as an inside corner portion, of the convex corner wall portion 21 of the heat transfer enhancement rib 15, that faces toward the downstream side is formed in a curved shape. Also, a recessed corner wall inside corner portion 23b, which is defined as an inside corner portion, of the recessed corner wall portion 23 of the heat transfer enhancement rib 15, that faces toward the upstream side, is formed in a curved shape.

In other words, in each heat transfer enhancement rib 15, the convex corner wall outside corner portion 21a and the recessed corner wall outside corner portion 23a which are outside corner portions of each convex corner wall portion 21 and each recessed corner wall portion 23 respectively protruding toward the upstream side and the downstream side, are formed in an angled shape, and the convex corner wall inside corner portion 21b and the recessed corner wall inside corner portion 23b which are inside corner portions on the back side of the above outside corner portions are formed in a curved shape.

In W-shaped heat transfer enhancement ribs, in general, outside corner portions facing toward the upstream side are formed in an angled shape, and therefore, when a cooling medium collides with the convex corner wall portions, an intense vortex flow occurs and thus cooling is enhanced. On the other hand, at the inside corner portions facing toward the upstream side, and the inside corner portions and the outside corner portions facing toward the downstream side, a vortex flow that contributes to the cooling effect does not occur. Accordingly, in the present embodiment shown in FIG. 2, curved-shape portions are formed at parts corresponding to the convex corner wall inside corner portions 21b of the convex corner wall portions 21 and the recessed corner wall inside corner portions 23b of the recessed corner wall portions 23, i.e., inside corner portions of the respective corner wall portions, among regions near outside corner portions that less contribute to the cooling effect in the heat transfer enhancement rib 15, thereby reducing stress concentration on those parts. Thus, it is possible to increase reliability of each heat transfer enhancement rib 15 while keeping the cooling effect of the cooling structure.

In the present embodiment, a radius of curvature R1 of each convex corner wall inside corner portion 21b of one heat transfer enhancement rib 15 of the heat transfer enhancement rib group 17 is equal to a radius of curvature R2 of each recessed corner wall inside corner portion 23b of another heat transfer enhancement rib 15 adjacent thereto, and is equal to a distance D between these adjacent heat transfer enhancement ribs 15, 15. The distance D between the heat transfer enhancement ribs 15, 15 refers to the distance in a direction perpendicular to their two rib walls extending in parallel with each other. Due to such configurations of the heat transfer enhancement rib group 17 as described above, it becomes possible to form the heat transfer enhancement rib group 17 with a reduced number of processing steps, using a cutting tool such as an end mill for performing cutting with a blade provided on the outer circumferential surface of a columnar rotary body, as described later.

An example of a method for forming the heat transfer enhancement rib group 17 in the cooling structure of the present embodiment shown in FIG. 2, will be described with reference to FIG. 3. The formation method includes a step of forming one W-shaped groove 31 by cutting the wall surface forming the passage wall 13 of the component member once along a trajectory TR having a predetermined W shape by the use of a cutting tool EM configured to perform cutting with a blade provided on the outer circumferential surface of a columnar rotary body. The cutting tool EM in this example has a processing diameter corresponding to the distance D between the adjacent heat transfer enhancement ribs. The step of forming such a W-shaped groove 31 is repeated to form a plurality of W-shaped grooves 31, arranged along the flow direction of the cooling medium CL, whereby the heat transfer enhancement ribs 15 are formed between those W-shaped grooves 31, 31.

In the example shown in FIG. 2, in the heat transfer enhancement rib group 17 to be formed, the radius of curvature R1 of each convex corner wall inside corner portion 21b of one heat transfer enhancement rib 15 is equal to the radius of curvature R2 of each recessed corner wall inside corner portion 23b of another heat transfer enhancement rib 15 adjacent thereto, and is equal to the distance D between these adjacent heat transfer enhancement ribs 15, 15. Therefore, it is possible to form the W-shaped groove 31 for forming a desired heat transfer enhancement rib group 17, by cutting the passage wall 13 once along the predetermined trajectory TR having a W shape, using the cutting tool EM.

Figure 4:
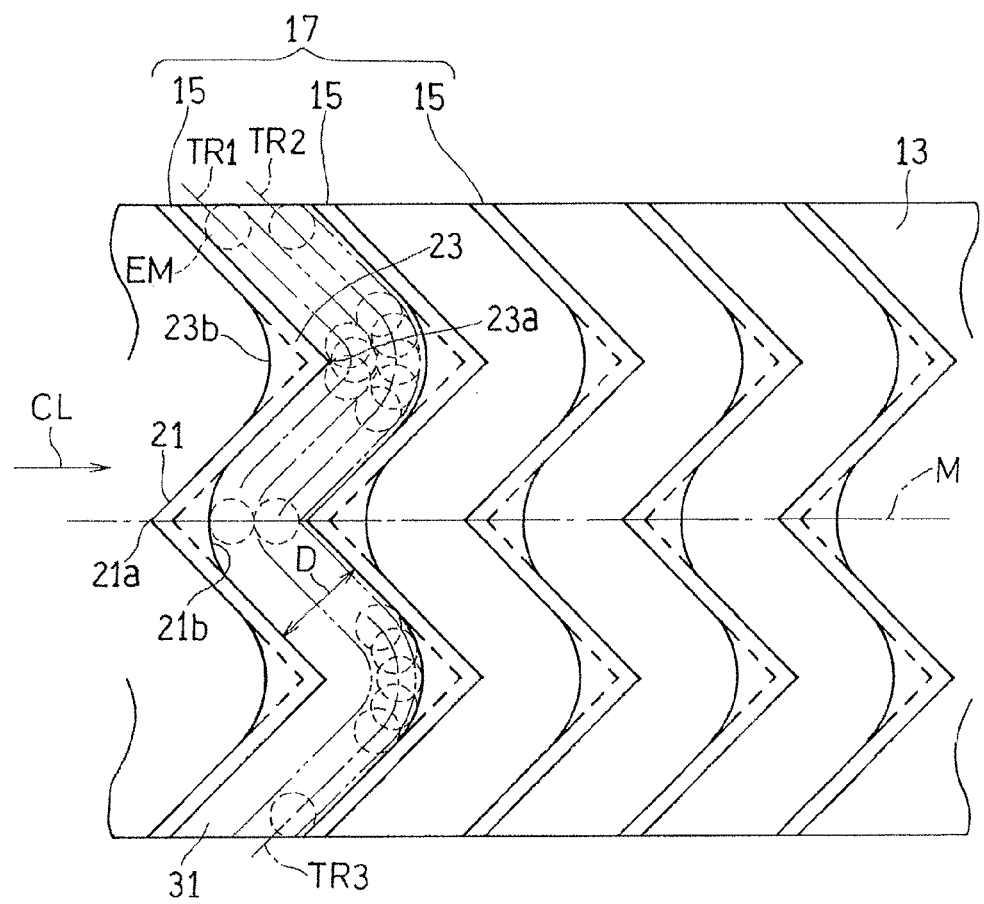
FIG. 4 is a schematic view showing another example of a method for forming a heat transfer enhancement rib group of the cooling structure shown in FIG. 2.

Depending on the processing diameter of the cutting tool EM and desired distance D between heat transfer enhancement ribs 15, 15, the number of times of cutting processing by the use of the cutting tool EM for forming one W-shaped groove 31 may be two or more, instead of one, as shown in FIG. 4. In an example shown in FIG. 4, in order to form a heat transfer enhancement rib group 17 having an inter-rib distance D that is 2.1 times as great as the processing diameter of the cutting tool EM, cutting is performed three times along a first trajectory TR1, a second trajectory TR2, and a third trajectory TR3 corresponding to a predetermined W shape. In FIG. 4, for convenience sake for illustration, the first trajectory TR1 and the second trajectory TR2 are shown above a center line M, and the third trajectory TR is shown below the center line M.

Figure 5:
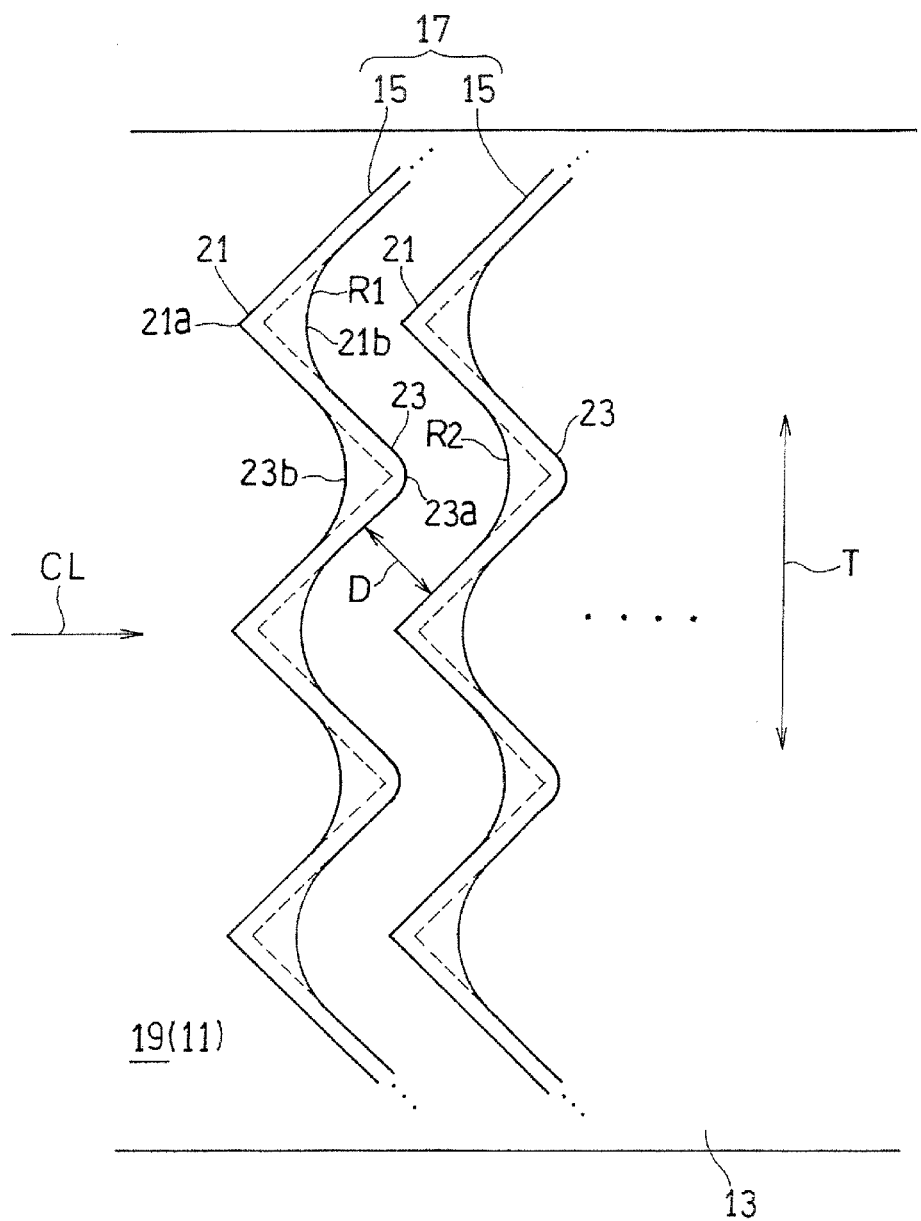
FIG. 5 is a plan view showing a schematic structure of a cooling structure according to another embodiment of the present invention.

FIG. 5 shows a cooling structure according to another embodiment of the present invention. In the present embodiment, the convex corner wall outside corner portions 21a of the convex corner wall portions 21 of each heat transfer enhancement rib 15 is formed in an angled shape, and the outside corner portions and the inside corner portions other than the convex corner wall outside corner portions 21a of each heat transfer enhancement rib 15, i.e., the convex corner wall inside corner portions 21b, the recessed corner wall outside corner portions 23a, and the recessed corner wall inside corner portions 23b are all formed in a curved shape.

Figure 3:
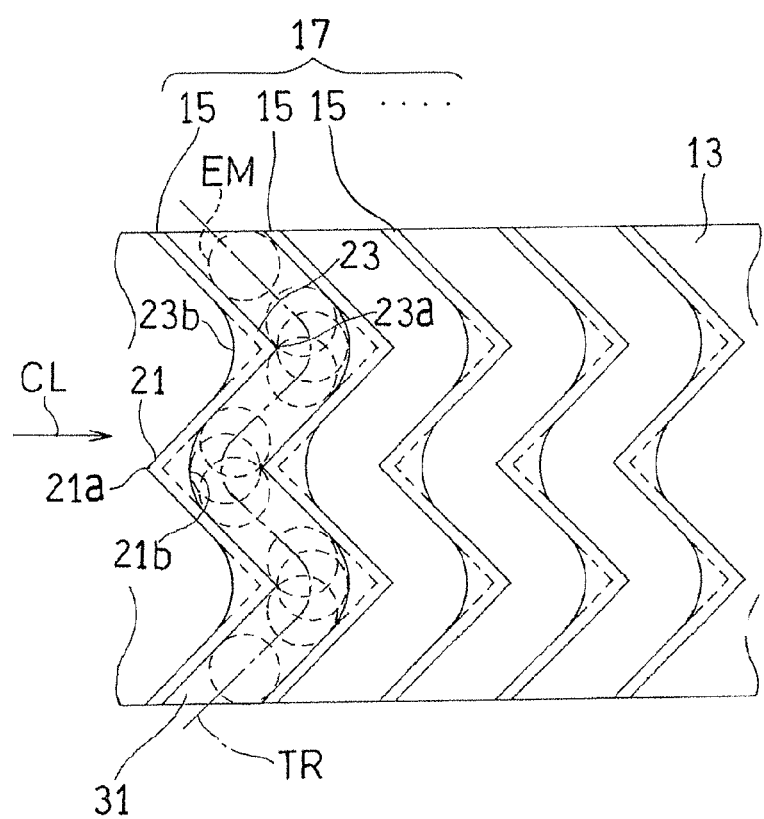
FIG. 3 is a schematic view showing an example of a method for forming a heat transfer enhancement rib group of the cooling structure shown in FIG. 2.

In the cooling structure according to the present embodiment, the outside corner portions and the inside corner portions at the parts that less contribute to the cooling effect, shown in FIG. 3, are all formed in a curved shape. Therefore, it is possible to further effectively prevent occurrence of a crack by reducing stress concentration on the outside corner portions and the inside corner portions, while keeping an excellent cooling effect of the cooling structure.

The heat transfer enhancement rib group 17 according to the present embodiment can also be formed using a cutting tool such as an end mill. In this case, after a W-shaped groove 31 is formed by the method described with reference to FIG. 3 and FIG. 4, the recessed corner wall outside corner portion 23a of each recessed corner wall portion 23 is processed into a curved shape using a cutting tool having a diameter that allows processing at a desired curvature.

In both embodiments shown in FIG. 2 and FIG. 5, the projection height of each heat transfer enhancement rib 15 from the wall surface is not specifically limited, but preferably, may be within a range of 1% to 3% of the passage height. An angle α (representatively shown in only FIG. 2) of each corner wall portion is not specifically limited, but preferably, may be within a range of 60° to 150°.

The portions to be formed in a curved shape in the heat transfer enhancement rib 15 are not limited to the examples described in the above embodiments, and at least any of the outside corner portion 23a and the inside corner portions 21b, 23b which less contribute to the cooling effect may be formed in a curved shape.

The above embodiments both have shown an example in which the heat transfer enhancement rib group 17 is formed using a cutting tool such as an end mill for performing cutting by a blade provided on the outer circumferential surface of a columnar rotary body. However, the heat transfer enhancement rib group 17 may be formed by a method other than the above method.

In the above embodiments, the combustor liner 5 has been described as an example of a cooling target, which is a component member of the gas turbine GT. However, a cooling target which is a component member is not limited thereto.

Although the present invention has been described above in connection with the preferred embodiments with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

5 . . . Combustor liner (Component member)
13 . . . Passage wall
15 . . . Heat transfer enhancement rib
17 . . . Heat transfer enhancement rib group
19 . . . Cooling medium passage
21 . . . Convex corner wall portion
21a . . . Convex corner wall outside corner portion
21b . . . Convex corner wall inside corner portion
23 . . . Recessed corner wall portion
23a . . . Recessed corner wall outside corner portion
23b . . . Recessed corner wall inside corner portion
A . . . Air (Working gas)
CL . . . Cooling medium
EM . . . Cutting tool
GT . . . Gas turbine engine

What is claimed is:

1. A cooling structure for a gas turbine engine, for cooling a component member of the gas turbine engine using a working gas of the gas turbine engine as a cooling medium, the gas turbine engine cooling structure comprising:
a passage wall formed from a part of the component member and facing a cooling medium passage through which the cooling medium flows; and
a plurality of heat transfer enhancement ribs projecting from a wall surface of the passage wall,
each of the plurality of heat transfer enhancement ribs including W shapes formed by a plurality of adjacent corner wall portions protruding alternately toward an upstream side and a downstream side in a flow direction of the cooling medium,
each of the plurality of corner wall portions protruding toward the upstream side of each of the plurality of heat transfer enhancement ribs comprising an outside corner portion facing the upstream side and an inside corner portion facing the downstream side,
each of the plurality of corner wall portions protruding toward the downstream side of each of the plurality of heat transfer enhancement ribs comprising an inside corner portion facing the upstream side and an outside corner portion facing the downstream side,
wherein each outside corner portion facing the upstream side is formed in an angled shape,
wherein the plurality of heat transfer enhancement ribs are distributed along the flow direction of the cooling medium such that the adjacent corner wall portions protruding toward the upstream side of one of the plurality of heat transfer enhancement ribs are respectively aligned with the adjacent corner wall portions protruding toward the upstream side of an adjacent one of the plurality of heat transfer enhancement ribs with respect to a transverse direction of the cooling medium passage, and the adjacent corner wall portions protruding toward the downstream side of the one of the plurality of heat transfer enhancement ribs, are respectively aligned with the adjacent corner wall portions protruding toward the downstream side of the adjacent one of the plurality of heat transfer enhancement ribs with respect to the transverse direction of the cooling medium passage,
each inside corner portion facing the upstream side and each inside corner portion facing the downstream side is formed in a curved shape, and
a radius of curvature of each inside corner portion facing the upstream side is equal to a radius of curvature of each inside corner portion facing the downstream side, and is equal to a distance between the one of the plurality of heat transfer enhancement ribs and the adjacent one of the plurality of heat transfer enhancement ribs.

2. The gas turbine engine cooling structure as claimed in claim 1, wherein each outside corner portion facing the downstream side is formed in a curved shape.

3. The gas turbine engine cooling structure as claimed in claim 1, wherein the component member is a combustor liner of a cylindrical shape forming a combustion chamber of a combustor therein, and the cooling medium passage is a supply passage for the working gas formed between the combustor liner and a casing of the combustor.

4. A method for forming a cooling structure for a gas turbine engine, for cooling a component member of the gas turbine engine using a working gas of the gas turbine engine as a cooling medium, the gas turbine engine cooling structure comprising:
- a passage wall formed from a part of the component member and facing a cooling medium passage through which the cooling medium flows; and
- a plurality of heat transfer enhancement ribs projecting from a wall surface of the passage wall,
- each of the plurality of heat transfer enhancement ribs including W shapes formed by a plurality of adjacent corner wall portions protruding alternately toward an upstream side or a downstream side in a flow direction of the cooling medium,
- each of the plurality of corner wall portions protruding toward the upstream side of each of the plurality of heat transfer enhancement ribs comprising an outside corner portion facing the upstream side and an inside corner portion facing the downstream side,
- each of the plurality of corner wall portions protruding toward the downstream side of each of the plurality of heat transfer enhancement ribs comprising an inside corner portion facing the upstream side and an outside corner portion facing the downstream side,
- wherein each outside corner portion facing the upstream side is formed in an angled shape,
- wherein the plurality of heat transfer enhancement ribs are distributed along the flow direction of the cooling medium such that the adjacent corner wall portions protruding toward the upstream side of one of the plurality of heat transfer enhancement ribs are respectively aligned with the adjacent corner wall portions protruding toward the upstream side of an adjacent one of the plurality of heat transfer enhancement ribs with respect to a transverse direction of the cooling medium passage, and the adjacent corner wall portions protruding toward the downstream side of the one of the plurality of heat transfer enhancement ribs, are respectively aligned with the corner wall portions protruding toward the downstream side of the adjacent one of the plurality of heat transfer enhancement ribs with respect to the transverse direction of the cooling medium passage,
- each inside corner portion facing the upstream side and each inside corner portion facing the downstream side is formed in a curved shape, and
- a radius of curvature of each inside corner portion facing the upstream side is equal to a radius of curvature of each inside corner portion facing toward the downstream side, and is equal to a distance between the one of the plurality of heat transfer enhancement ribs and the adjacent one of the plurality of heat transfer enhancement ribs, the method comprising:
- forming one W-shaped groove by cutting the wall surface of the passage wall of the component member once or a plurality of times along a trajectory having a predetermined W shape by the use of a cutting tool configured to perform cutting with a blade provided on an outer circumferential surface of a columnar rotary body.

5. A method for forming a cooling structure for a gas turbine engine, for cooling g component member of the gas turbine engine using a working gas of the gas turbine engine as a cooling medium, the gas turbine engine cooling structure comprising:
- a passage wall formed from a part of the component member and facing a cooling medium passage through which the cooling medium flows; and
- a plurality of heat transfer enhancement ribs projecting from a wall surface of the passage wall,
- each of the plurality of heat transfer enhancement ribs including W shapes formed by a plurality of adjacent corner wall portions protruding alternately toward an upstream side or a downstream side in a flow direction of the cooling medium,
- each of the plurality of corner wall portions protruding toward the upstream side of each of the plurality of heat transfer enhancement ribs comprising an outside corner portion facing the upstream side and an inside corner portion facing the downstream side,
- each of the plurality of corner wall portions protruding toward the downstream side of each of the plurality of heat transfer enhancement ribs comprising an inside corner portion facing the upstream side and an outside corner portion facing the downstream side,
- wherein each outside corner portion facing the upstream side is formed in an angled shape,
- wherein the plurality of heat transfer enhancement ribs are distributed along the flow direction of the cooling medium such that the adjacent corner wall portions protruding toward the upstream side of one of the plurality of heat transfer enhancement ribs are respectively aliened with the adjacent corner wall portions protruding toward the upstream side of an adjacent one of the plurality of heat transfer enhancement ribs with respect to a transverse direction of the cooling medium passage, and the adjacent corner wall portions protruding toward the downstream side of the one of the plurality of heat transfer enhancement ribs, are respectively aligned with the corner wall portions protruding toward the downstream side of the adjacent one of the plurality of heat transfer enhancement ribs with respect to the transverse direction of the cooling medium passage,
- each inside corner portion facing the upstream side and each inside corner portion facing the downstream side is formed in a curved shape, and a radius of curvature of each inside corner portion facing the upstream side is equal to a radius of curvature of each inside corner portion facing toward the downstream side, and is equal to a distance between the one of the plurality of heat transfer enhancement ribs and the adjacent one of the plurality of heat transfer enhancement ribs, the method comprising:
- forming one W-shaped groove by cutting the wall surface of the passage wall of the component member once along a trajectory having a predetermined W shape by the use of a cutting tool having a processing diameter corresponding to the distance between the one of the heat transfer enhancement ribs and the adjacent one of the heat transfer enhancement ribs and configured to perform cutting with a blade provided on an outer circumferential surface of a columnar rotary body.

* * * * *